US012201229B2

(12) United States Patent
Smith, III

(10) Patent No.: US 12,201,229 B2
(45) Date of Patent: *Jan. 21, 2025

(54) MULTI-CHAMBERED DRINKING VESSEL

(71) Applicant: William Hardy Smith, III, Houston, TX (US)

(72) Inventor: William Hardy Smith, III, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/533,581

(22) Filed: Dec. 8, 2023

(65) Prior Publication Data
US 2024/0099486 A1 Mar. 28, 2024

Related U.S. Application Data

(63) Continuation of application No. 17/524,864, filed on Nov. 12, 2021, now Pat. No. 11,839,317.

(60) Provisional application No. 63/112,960, filed on Nov. 12, 2020.

(51) Int. Cl.
| | |
|---|---|
| *B65D 81/32* | (2006.01) |
| *A23G 9/04* | (2006.01) |
| *A23G 9/08* | (2006.01) |
| *A47G 19/22* | (2006.01) |

(52) U.S. Cl.
CPC ......... *A47G 19/2205* (2013.01); *A23G 9/045* (2013.01); *A23G 9/08* (2013.01)

(58) Field of Classification Search
CPC ........ B65D 25/08; B65D 25/04; B65D 81/32; B65D 81/3211; B65D 1/04; B65D 1/265; A47G 19/2205; A47G 19/2211; A47G 2019/122; A61J 1/2093; A61J 19/22; A61J 19/02
USPC .......... 222/145.5, 129; 215/6; 220/719, 505, 220/501
See application file for complete search history.

(56) References Cited

U.S. PATENT DOCUMENTS

| | | | | |
|---|---|---|---|---|
| 2,428,056 A * | 9/1947 | Wachsman | ......... | A47G 19/2211 220/529 |
| 3,549,044 A * | 12/1970 | Lerner | ............... | A47G 19/2211 220/719 |
| 5,370,258 A * | 12/1994 | Fair | .................... | A47G 19/2211 220/501 |
| 8,800,802 B2 * | 8/2014 | Martin | ..................... | B65D 3/14 220/531 |
| 9,463,899 B2 * | 10/2016 | Strominger | ........ | B65D 21/0209 |

* cited by examiner

*Primary Examiner* — King M Chu
(74) *Attorney, Agent, or Firm* — Egbert, McDaniel & Swartz, PLLC

(57) ABSTRACT

A drinking vessel has a body with a plurality of chambers formed therein and an access channel opening to a compartment at a base of the body. Each of the plurality of chambers opens to the compartment at the bottom of the body. Each of the plurality of chambers opens at a top of the body. The access channel is adapted to receive a straw or a tube therein. The body is a plurality of walls formed therein. The plurality walls define the plurality of channels in the body. The plurality walls extend from an inner wall of the body to an exterior of the access channel.

18 Claims, 3 Drawing Sheets

MULTI-CHAMBERED DRINKING VESSEL

RELATED U.S. APPLICATIONS

The present application is a continuation of U.S. patent application Ser. No. 17/524,864, filed on Nov. 12, 2021, presently U.S. patent application Ser. No. 17/524,864 claims priority from U.S. Provisional Application No. 63/112,960, filed on Nov. 12, 2020.

BACKGROUND OF THE INVENTION

1. Field of the Invention

The present invention relates to drinking vessels and glasses. More particularly, the present invention relates to drinking vessels that have multiple chambers therein. More particularly, the present invention the relates to drinking vessels for used for the purpose of mixing frozen drinks.

2. Description of Related Art Including Information Disclosed Under 37 CFR 1.97 and 37 CFR 1.98

A mixed drink is a type of beverage in which two or more different ingredients are mixed together to create a different drink Mixed drinks can refer to cocktails (which are one or more distilled spirits combined with drink mixers); mixed drink shooters and drink shots (which are small servings of cocktails in special glasses); beer cocktails (which combined beer with a drink mixer or distilled spirits); wine cocktails and punches (which combine wine with drink mixers); flaming beverages (which are cocktails containing a high-proof alcohol ignited prior to serving); and non-alcoholic mixed drinks (which are soft drinks that do not contain alcohol). Frozen mixed drinks are quite popular presently. Frozen mixed drinks combine different slushy mixers so as to create a unique appearance of layers within the glass. During consumption, the uppermost slushy mixer is consumed first, and then the lower layers are consumed subsequently. If desired, the various layers can be vigorously mixed so as to create the combined beverage, but lacking the unique appearance of the layers of slushy mixers. In many circumstances, the combined flavors of the mixers is more desirable than the taste of the individual mixers. As such, the individual component would be mixed together prior to consumption.

Often, it is difficult for the amateur bartender to properly mix the components of the mixed drink Under certain circumstances, one component will have a greater proportion of the combined mixture than another component. As such, a need has developed so as to allow the amateur bartender to more accurately mix the ingredients together.

In the past, various patents and patent application publications have issued with respect to multi-chamber drinking vessels. For example, U.S. Pat. No. 4,955,503, issued on Sep. 11, 1990 to M. L. Propes, describes a partitioned drinking cup having a first drinking compartment and a second drinking department effectively isolated from each other by a partition, and a seal when a lid is fitted over the open top of the cup. Interfitting parts align the lid so that the dispensing outlets are correctly positioned over drinking compartments.

U.S. Pat. No. 5,405,030, issued on Apr. 11, 1995 to S. J. Frazier, describes a dual-compartment drinking cup that has a generally cylindrical rim portion and at least semi-cylindrical base portion. A semi-cylindrical rear wall is disposed between a segment of the rim portion and the base portion. A semi-cylindrical front wall is disposed between the remaining segment of the rim portion at a level significantly above the base portion. A rear floor joins the lower ends of the rear wall and the base portion. An upper floor joins the front wall at the defined level. The relative volumes of the front and rear compartments are selected so that upon draining the front compartment, the rear compartment retains a volume about half that originally poured into the drinking cup.

U.S. Pat. No. 5,553,725, issued on Sep. 10, 1996 to K. P. Clemons, shows a quarters glass that has two compartments. One of the compartments receives a liquid and the other compartment receives a quarter which is bounced off a surface. A slot is formed in the second compartment to permit the quarter to exit the glass.

U.S. Pat. No. 7,165,697, issued on Jan. 23, 2007 to J. Checkalski, provides a concentric two-compartment drinking vessel that includes an outer drinking vessel having a closed bottom section, a generally vertical sidewall section with an upper rim therearound and an open top. Within the outer vessel is an inner, closed bottom, linear vessel with a sidewall section having an upper rim therearound and an open top. The interior vessel sidewall section extends essentially diagonally from or near the outer vessel upper rim to a selected point adjacent the sidewall. Liquids poured into the outer vessel and inner vessel are separately contained until the two-compartment vessel is tilted to drink. The liquid contained by the inner vessel flows from the two-compartment vessel prior to the liquid contained in the outer vessel flowing therefrom.

U.S. Pat. No. 8,272,529, issued on Sep. 25, 2012 to Mansfield et al., discloses a multi-chamber drinking cup. This drinking cup has an outer chamber having an outer rim disposed at its top and a chamber disposed inside the outer chamber having an inner rim disposed below the outer rim. The inner rim is disposed below the outer rim to optimize mixing fluids poured from the chambers when consumed by humans while not interfering with their noses.

U.S. Pat. No. 8,777,044, issued on Jul. 15, 2014 to Raymus et al., shows a beverage holding device comprising a container and a removably engageable lid. The container includes a partition extending between opposing sides of the sidewall of the container to define a plurality of separated cavities. The partition includes an edge surface forming an interior seal against a lower surface of the lid upon engagement of the lid with the container so as to maintain the plurality of cavities fluidly separated.

U.S. Pat. No. 10,005,589, issued on Jun. 26, 2018 to M. S. Clark, teaches a two-in-one drinking vessel having a body portion with a sidewall forming an outer compartment and an inner compartment disposed within the outer compartment. The inner compartment may be fixedly or removably attached to the body, or attached to a lid. Each of the compartments opens at the top and has a threaded upper portion in which the lid can be attached.

U.S. Patent Application Publication No. 2005/0150896, published on Jun. 14, 2005 to M. G. Morrison, provides a drinking flask having a first compartment for storing a quantity of a first liquid for drinking and a second compartment for storing a food item. A third compartment can store another food item. A valve fluidly couples the first compartment and a fourth compartment when pressure is applied to the flask to dispense a portion of the quantity of the first liquid into the fourth compartment for drinking by user through a drink opening.

U.S. Patent Application Publication No. 2009/0065503, published a Mar. 12, 2009 to B. Hertzig, discloses a multi-chambered beverage container configured to store a plurality of separate liquids and to facilitate the simultaneous consumption thereof. There is a container having a divider configured to separate a first chamber and a second chamber. The container includes a lid having a first aperture and a second aperture therethrough. The container has a first straw disposed through the first aperture. A top portion of the first straw is substantially acircular and having a first mating side. A second straw is disposed to the second aperture. The top portion of second straw is substantially acircular and includes a second mating surface configured to mate with the first mating surface.

U.S. Patent Application Publication No. 2009/0188929, published on Jul. 30, 2009 to Sims et al., provides a drinking cup having a vessel, a partition positioned within the vessel, and a clip coupled to the vessel. The vessel has a sidewall and a bottom defining an interior configured to retain a liquid. The partition divides the interior of the vessel into at least two compartments. The clip is configured to receive at least one drinking straw.

It is an object of the present invention to provide a multi-chamber drinking vessel that allows for the consumption of mixed liquids.

It is another object of the present invention to provide a multi-chamber drinking vessel which allows the separate components of the mixed drink to be displayed separately prior to consumption.

It is another object of the present invention to provide a multi-chamber drinking vessel which facilitates the consumption of the mixed beverage through a straw.

It is another object of the present invention to provide a multi-chamber drinking vessel which facilitates the ability to accurately mix the components of the mixed drink.

It is still a further object of the present invention to provide a multi-chamber drinking vessel which displays the consumption of the various components of the mixed beverage in a real-time manner.

It is still another object of the present invention to provide a multi-chamber drinking vessel which has an aesthetically pleasing appearance.

It is still another object of the present invention provide a multi-chamber drinking vessel which is easy to use and relatively inexpensive.

These and other objects and advantages of the present invention will become apparent from a reading of the attached specification and appended claims.

BRIEF SUMMARY OF THE INVENTION

The preferred embodiment of the present invention is a multi-chamber drinking vessel that has a body with a plurality of chambers formed therein. Each of the plurality of chambers opens to a compartment at the base of the body. Each of the plurality of chambers opens at the top of the body. An access channel opens to the compartment at the base of the body. The access channel is adapted to receive a straw or a tube therein.

The body has a plurality walls formed therein. The plurality of walls define the plurality of chambers. The plurality of walls extends from an inner wall of the body to an exterior of the access channel. The plurality of walls each have a top edge and a bottom edge. The top edge is flush with the top of the body. The bottom edge of the plurality of walls bears against the base of the body. Each of the plurality of walls has a curved shape. The plurality of walls are in evenly spaced relationship from each other such that each of the plurality of chambers has an identical volume.

The body has an inverted frustoconical shape. The top of the body has a diameter greater than a diameter of the bottom of the body. The base of the body is affixed to a bottom of the body. The base has a plurality of ridges respectively affixed to the bottom edge of the plurality of walls. In the preferred embodiment of the present invention, the plurality of chambers comprises three chambers. The plurality of walls radiate outwardly from the access channel toward the inner wall of the body.

The access channel has a tubular shape. The access channel has a top that is coplanar with the top of the body. The access channel has a bottom communicating with the compartment at the base. The access channel extends entirely vertically or near-vertically interior of the body. In the preferred embodiment the present invention, the access channel is located centrally of a circumference of the body.

A straw can be removably received in the access channel. The straw has a bottom end positionable in the compartment at the base of the body. A first liquid can be received in one of the plurality of chambers. A first liquid is received in one of the plurality of chambers and a second liquid is received in another of the plurality of chambers. The first and second liquids mixed together in the compartment at the base of the body. At least one of the first and second liquids is a slushy liquid.

This foregoing Section is intended to describe, with particularity, the preferred embodiment of the present invention. It is understood that modifications to this preferred embodiment can be made within the scope of the present claims without departing from the spirt of the invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
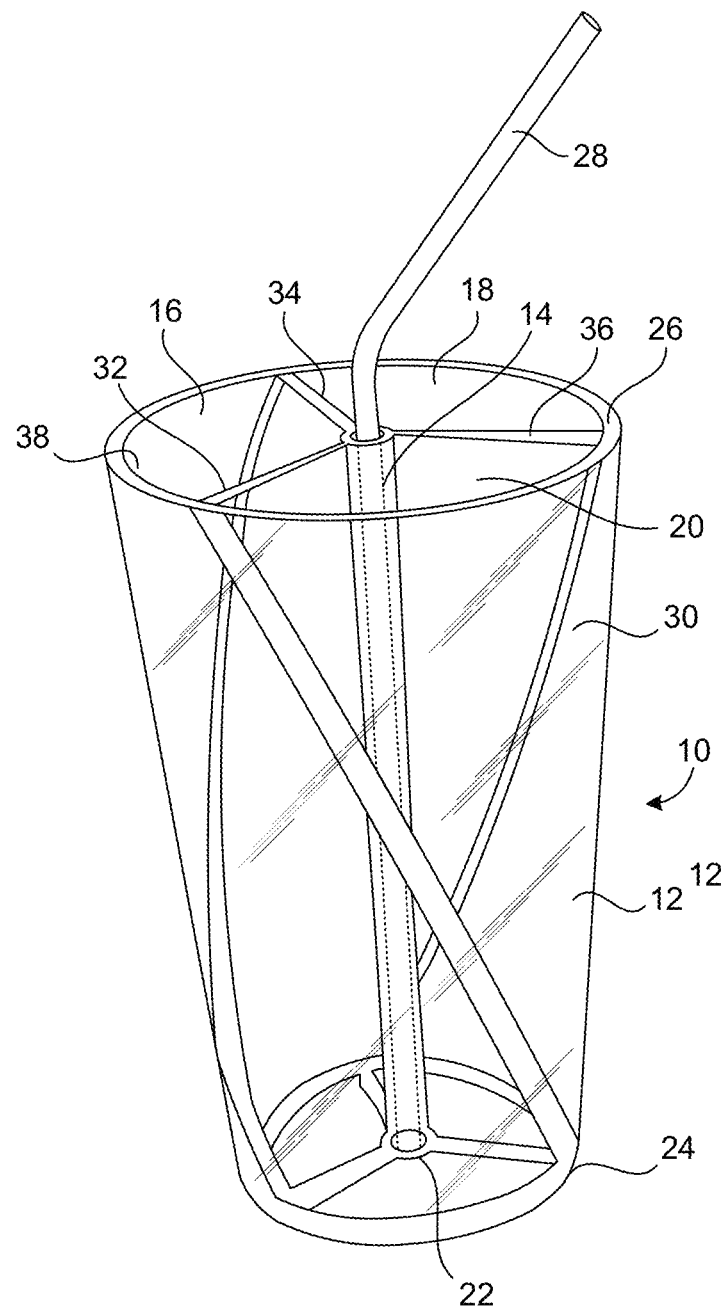
FIG. 1 is a perspective view of the multi-chamber drinking vessel of the present invention.

Referring to FIG. 1, there is shown the multi-chamber drinking vessel 10 in accordance with the present invention. The multi-chamber drinking vessel 10 has a body 12 and an access channel 14. The body 12 has a plurality of chambers 16, 18 and 20 formed therein. Each of the plurality of chambers 16, 18 and 20 opens to a compartment 22 located at the base 24 of the body 12. Each of the plurality of chambers 16, 18 and 20 also opens at the top 26 of the body 12. The access channel 14 opens to the compartment 22 at the base 24 of the body 12. The access channel 14 is adapted to receive a straw 28 therein.

As can be seen in FIG. 1, the chambers 16, 18 and 20 can be filled with different liquids. These liquids can be in the nature of a frozen mixers or other liquids. Ultimately, the liquids will be received within the chambers 16, 18 and 20. As the liquid is consumed through straw 28 by a user, the separate liquids contained in the chambers 16, 18 and 20 will move, by gravity and by suction, into the compartment 22 at the base 24 of the body 12. As such, it is the mixture of the liquid components in the chambers 16, 18 and 20 that is actually consumed by the user. Since the body of the multi-chamber drinking vessel 10 is transparent or translucent, the aesthetically pleasing appearance of the separate components of the mixed drink is displayed through the wall of the body 12. As the separate components are consumed, the amount of consumption of the separate components can also be easily seen through the wall 30. Under certain circumstances, one of the components can have a greater thickness or density than the other components. As such, as the slushy components continue to melt, the amount of mixing between the components will vary over time. As such, a unique appearance is created whereby the less dense component is consumed prior to the more dense component. This relationship can be seen by the person consuming the mixed drink. When the components have equal densities, the amount of liquid remaining in the drinking vessel 10 should remain constant between the various components. The present invention allows for the accurate mixing of the components due to visual access of each of the chambers 16, 18 and 20. Certain consumers find that it is a unique experience to have the taste and flavor of the mixed drink change during the consumption of the mixed drink Once again, by varying the density of the various liquids contained in the chambers 16, 18 and 20, the taste and flavor of the beverage can change with time. For example, a mixologist can have a sour component of less density and a sweet component of greater density. As such, the mixed drink will initially have a sour taste and would conclude with a sweet taste.

FIG. 1 shows that the multi-chamber drinking vessel 10 has a plurality of walls 32, 34 and 36 formed therein. Walls 32 and 34 define chamber 16. Walls 34 and 36 define chamber 18. Walls 32 and 36 define chamber 20. The plurality of walls extends from an inner wall 38 of the body 12 to an exterior of the access channel 14. Each of the plurality of walls 32, 34 and 36 has a top edge that is flush with the top 26 of the body 12. The bottom edge of the walls 32, 34 and 36 will bear against the base 24 of the body 12.

It can be seen in FIG. 1 that each of the walls 32, 34 and 36 has a curved non-planar shape. In the preferred embodiment of the present invention, this curved shape enhances the unique appearance of the separate chambers 16, 18 and 20. However, within the concept of the present invention, the walls 32, 34 and 36 can be planar or of other shapes. In FIG. 1, three chambers 16, 18 and 20 are illustrated. However, within the concept of the present invention, fewer chambers or more chambers can be incorporated into the multi-chamber drinking vessel 10. The walls 32, 34 and 36 are illustrated in the preferred embodiment as having an edge coplanar with the top 26 of the body 12. However, within the concept of the present invention, the top edge of the walls 32, 34 and 36 can be recessed below this top edge 26.

Figure 2:
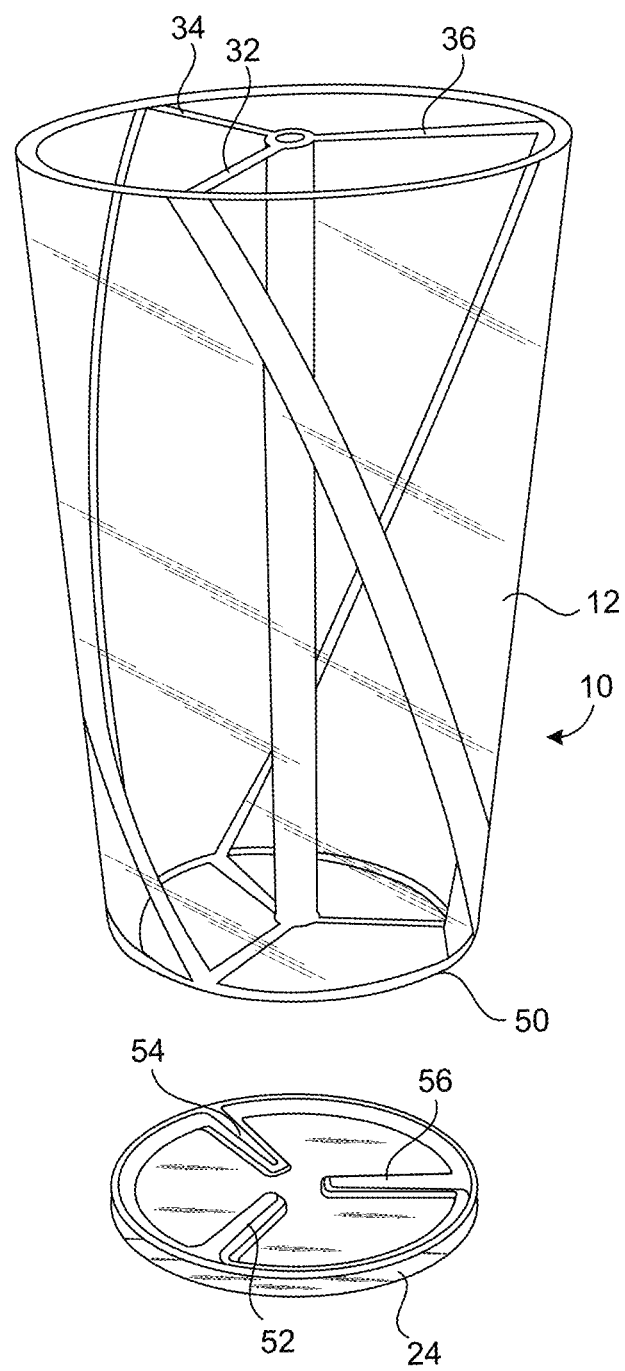
FIG. 2 is a perspective exploded view of the multi-chamber drinking vessel of the present invention.

The body 12 has an inverted frustoconical shape. In other words, the top 26 of the body 12 has a diameter greater than a diameter of the base 24. The base 24 of the body 12 is actually affixed to a bottom of the body 12 (as shown in FIG. 2).

The plurality of walls 32, 34 and 36 radiate outwardly from the access channel 14 toward the inner wall 38 of the body 12. In the preferred embodiment the present invention, the walls 32, 34 and 36 define the chambers 16, 18 and 20.

Each of the chambers 16, 18 and 20 has an identical volume. However, within the concept of the present invention, the walls 32, 34 and 36 (or additional or fewer walls) can be suitably arranged so that the chambers 16, 18 and 20 have different volumes.

The access channel 14 has a tubular shape. It can be seen that the access channel 14 has a top that is coplanar with the top 26 of the body 12. The access channel 14 has a bottom communicating with the compartment 22 at the base 24 of the body 12. The access channel 14 extends generally vertically within the interior of the body. In the preferred embodiment, the access channel 14 can be at a slight angle to vertical (such as up to 1.5°). However, it can be envisioned that, within the concept of the present invention, the access channel 14 can extend in a curved configuration or other arrangement. The preferred embodiment the present invention, as shown in FIG. 1, shows the access channel 14 located centrally in the interior of the body. However, this access channel can be offset from the central location, as desired.

The straw 28 is removably received in the access channel 14. The straw has a bottom end that is positioned in the compartment 22 at the base 24 of the body 12.

FIG. 2 particularly illustrates the base 24 of the body 12. Within the concept of the present invention, the multi-chamber drinking vessel 10 is molded in two parts. The base 24 can be joined to the body 12 with adhesives or with friction welding. The base 24 could also be integrally formed with the body 12. FIG. 2 shows that the base 24 can be secured to the bottom 50 of the body 12. In particular, the base 24 has ridges 52, 54 and 56 extending upwardly therefrom. Ridge 52 can be joined to the bottom edge of the wall 34. Ridge 54 can be joined to the bottom edge of the wall 36. Ridge 56 can be joined to the bottom edge of the wall 32. The outer periphery of the base 24 can be simply molded with or joined to the bottom 50 of the body 12.

Figure 3:
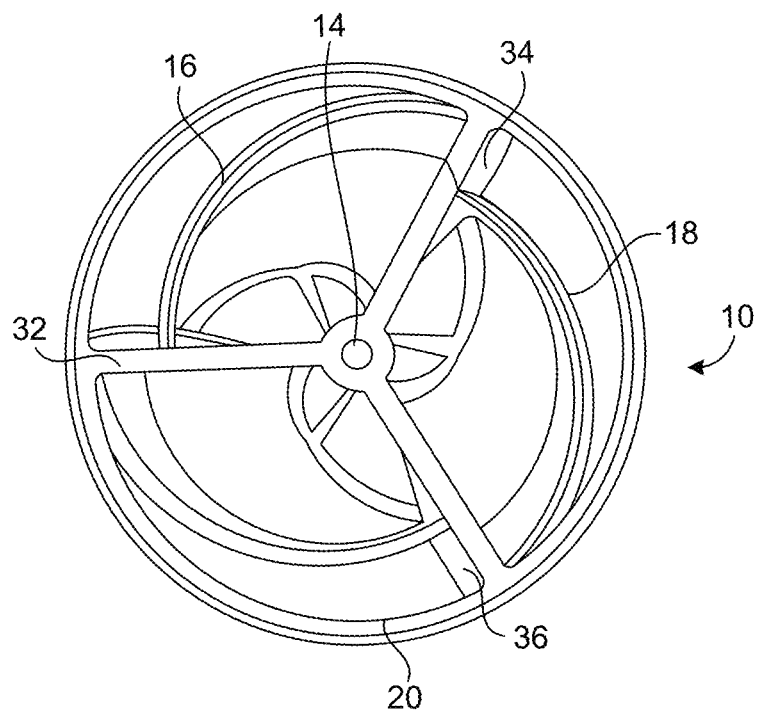
FIG. 3 is a plan view of the multi-chamber drinking vessel of the present invention.

FIG. 3 shows a plan view of the multichamber drinking vessel 10 of the present invention. In FIG. 3, it can be seen that the access channel 14 has a tubular configuration suitable for receiving a straw therein. Walls 32, 34 and 36 define the respective chambers 16, 18 and 20. FIG. 3 further shows that the walls 32, 34 and 36 have a generally curved configuration so as to create a swirl-like appearance. The curved shape of each of the walls 32, 34 and 36 serves to direct the particular component toward the compartment 22 in a "sliding" manner. This curved shape of each of the walls enhances the movement of the slushy liquid toward the compartment 22.

Figure 4:
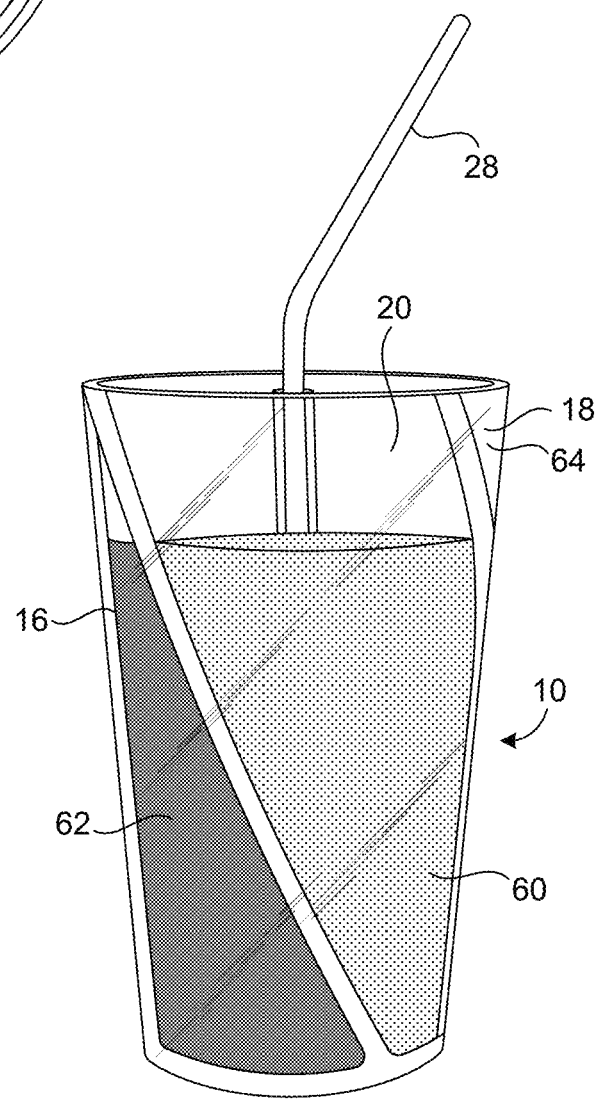
FIG. 4 is a side elevational view showing the multi-chamber drinking vessel of the present invention with liquids contained therein.

FIG. 4 shows they multichamber drinking vessel 10 of the present invention having the components therein. FIG. 4 shows that there is a first liquid 60 located in chamber 20. A second liquid 62 is located in chamber 16. There can be another liquid 64 located in the chamber 18. Ultimately, each of the liquids 60, 62 and 64 can be directed downwardly toward the compartment 22. Consumption of the liquid occurs through the straw 28. At least one of the liquids 60, 62 and 64 can be a slushy liquid. Ultimately, it is desirable that each of the liquids 60, 62 and 64 has a different taste, color, or alcohol content.

The foregoing disclosure and description of the invention is illustrative and explanatory thereof. Various changes in the details of the illustrated construction can be made is the scope of the present invention without departing from the true spirit of the invention. The present invention should only be limited by the following claims and their legal equivalents.

I claim:

1. A drinking vessel comprising:
   a body having a plurality of chambers formed therein, each of the plurality of chambers opening to a compartment at a bottom of said body, each of the plurality of chambers opening at the top of said body, said body having a plurality of walls formed therein, the plurality of walls defining the plurality of chambers in the body, each of the plurality walls having a curved shape such that a portion of one chamber of the plurality of chambers is directly above a portion of an adjacent chamber of the plurality of chambers; and
   an access channel opening to the compartment at a base of said body, said access channel adapted to receive a straw or a tube therein, said access channel having a solid wall with no openings therethrough.

2. The drinking vessel of claim 1, further comprising:
   a straw or tube removably received in said access channel.

3. The drinking vessel of claim 2, wherein a bottom end of the straw is positioned in the compartment when fully received in the access channel so as to block mixing between the plurality of chambers.

4. The drinking vessel of claim 2, said access channel has a circular tubular shape.

5. The drinking vessel of claim 1, the plurality walls being in evenly spaced relationship with each other such that the plurality of chambers each has an identical volume.

6. The drinking vessel of claim 1, wherein the base of said body is affixed to the bottom of said body, wherein the base has a plurality of ridges respectively affixed to a bottom edge of the plurality of walls.

7. The drinking vessel of claim 1, wherein the plurality of walls radiate outwardly from said access channel toward an inner wall of said body.

8. The drinking vessel of claim 1, further comprising:
   a first liquid received in one of the plurality of chambers.

9. The drinking vessel of claim 8, further comprising:
   a second liquid received in another chamber of the plurality of chambers, said first and second liquids being mixed together in the compartment at the base of said body, at least one of the first and second liquids being a slushy liquid.

10. A drinking vessel comprising:
    a body having a plurality of chambers formed therein, each of the plurality of chambers opening to a compartment at a bottom of said body, each of the plurality of chambers opening at the top of said body;
    an access channel opening to the compartment at a base of said body, said access channel said access channel having a circular tubular shape; and
    a straw removably received in said access channel, wherein a bottom end of the straw is positioned in the compartment when fully received in the access channel so as to block mixing between the plurality of chambers.

11. The drinking vessel of claim 10, wherein the access channel has a solid wall with no openings therethrough.

12. The drinking vessel of claim 10, said body having a plurality of walls formed therein, the plurality of walls defining the plurality of chambers in the body, each of the plurality walls having a curved shape such that a portion of one chamber of the plurality of chambers is directly above a portion of an adjacent chamber of the plurality of chambers.

13. A drinking vessel comprising:
    a body having a plurality of chambers formed therein, each of the plurality of chambers opening at the top of said body;
    a plurality of walls formed in said body, the plurality of walls defining the plurality of chambers in the body, each of the plurality walls having a curved shape such that a portion of one chamber of the plurality of chambers is directly above a portion of an adjacent chamber of the plurality of chambers; and
    an access channel opening adjacent a base of said body, said access channel being adapted to receive a straw or a tube therein from an opening adjacent a top of said body, said access channel being in fluid communication with each of the plurality of chambers adjacent the base of said body.

14. The drinking vessel of claim 13, wherein the access channel has a circular tubular shape.

15. The drinking vessel of claim 14, wherein the access channel has a solid wall with no openings therethrough.

16. The drinking vessel of claim 13, further comprising a straw or tube removably received in said access channel.

17. The drinking vessel of claim 16, wherein a bottom end of the straw or tube is positioned adjacent the base of said body when fully received in the access channel so as to block mixing between the plurality of chambers.

18. The drinking vessel of claim 13, further comprising:
    a first liquid received said one chamber of the plurality of chambers; and
    a second liquid received in another chamber of the plurality of chambers.

* * * * *